United States Patent
Miyoshi et al.

(10) Patent No.: US 9,616,967 B2
(45) Date of Patent: Apr. 11, 2017

(54) BICYCLE CONTROL SYSTEM

(71) Applicant: Shimano Inc., Sakai, Osaka (JP)

(72) Inventors: Hiroyuki Miyoshi, Osaka (JP); Jun Gao, Osaka (JP); Ayumi Kato, Osaka (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 14/875,974

(22) Filed: Oct. 6, 2015

(65) Prior Publication Data

US 2016/0121962 A1 May 5, 2016

(30) Foreign Application Priority Data

Oct. 31, 2014 (JP) ................. 2014-223106

(51) Int. Cl.
*B62M 6/45* (2010.01)
*B60L 11/18* (2006.01)
*B62M 25/08* (2006.01)
*B62J 99/00* (2009.01)
*B62M 25/00* (2006.01)

(52) U.S. Cl.
CPC ............ *B62M 6/45* (2013.01); *B60L 11/1805* (2013.01); *B62J 99/00* (2013.01); *B62M 25/08* (2013.01); *B62J 2099/002* (2013.01); *B62J 2099/0013* (2013.01); *B62M 2025/003* (2013.01)

(58) Field of Classification Search
CPC .................................. B62M 6/45; F16H 59/04
See application file for complete search history.

(56) References Cited

U.S. PATENT DOCUMENTS

| | | | | |
|---|---|---|---|---|
| 8,297,384 | B2* | 10/2012 | Wanger | B62K 27/003 180/11 |
| 2004/0239489 | A1* | 12/2004 | Takeda | B62J 99/00 340/432 |
| 2010/0228405 | A1* | 9/2010 | Morgal | B62H 3/02 701/2 |
| 2011/0125402 | A1* | 5/2011 | Mitsugi | G01C 21/20 701/532 |
| 2011/0159921 | A1* | 6/2011 | Davis | H04M 1/72569 455/556.1 |
| 2011/0267178 | A1* | 11/2011 | Nishihara | B62K 23/02 340/12.39 |
| 2012/0253600 | A1* | 10/2012 | Ichida | B62M 25/08 701/37 |
| 2012/0253601 | A1* | 10/2012 | Ichida | B60G 17/018 701/37 |

(Continued)

FOREIGN PATENT DOCUMENTS

EP 2 072 091 A1 6/2009
JP 7-232680 A 9/1995
(Continued)

*Primary Examiner* — Thomas Tarcza
*Assistant Examiner* — Alex C Dunn
(74) *Attorney, Agent, or Firm* — Global IP Counselors, LLP

(57) ABSTRACT

A bicycle control system is basically provided with a plurality of electric units. Each of the plurality of electric units is configured to be mounted to a bicycle. Each of the plurality of electric units includes a storage unit. At least two of the storage units of the plurality of electric units store at least two common pieces of information.

20 Claims, 4 Drawing Sheets

(56) References Cited

U.S. PATENT DOCUMENTS

| | | | | |
|---|---|---|---|---|
| 2012/0253606 A1* | 10/2012 | Takamoto | ................ | B62J 15/00 |
| | | | | 701/48 |
| 2013/0314205 A1* | 11/2013 | Neupert | ................... | B62M 6/40 |
| | | | | 340/5.2 |
| 2014/0089243 A1* | 3/2014 | Oppenheimer | ......... | G06F 21/50 |
| | | | | 706/46 |
| 2014/0102237 A1* | 4/2014 | Jordan | ................... | B62K 23/02 |
| | | | | 74/473.12 |

FOREIGN PATENT DOCUMENTS

| JP | 10-91505 A | 4/1998 |
|---|---|---|
| JP | 2001-122180 A | 5/2001 |
| JP | 2004-175259 A | 6/2004 |
| JP | 2013-32028 A | 2/2013 |
| JP | 2014-019181 A | 2/2014 |

* cited by examiner

BICYCLE CONTROL SYSTEM

CROSS-REFERENCE TO RELATED APPLICATIONS

This application claims priority to Japanese Patent Application No. 2014-223106, filed on Oct. 31, 2014. The entire disclosure of Japanese Patent Application No. 2014-223106 is hereby incorporated herein by reference.

BACKGROUND

Field of the Invention

This invention generally relates to a bicycle control system. More specifically, the present invention relates to a bicycle control system that a plurality of controls electric units.

Background Information

Some bicycles include a bicycle control system having a plurality of electric units with each of the electric units including a storage unit. One example of a conventional bicycle control system is disclosed in Japanese Laid-Open Patent Application No. 2009-166830. In this conventional bicycle control system, the storage units of the electric units each stores different information.

SUMMARY

Generally, the present disclosure is directed to various features of a bicycle control system. In the conventional bicycle control system described above, information (data) stored in the storage unit of the electric unit will be lost from the bicycle control system when replacing the electric unit. Likewise, information (data) stored in the storage unit of the electric unit will be lost from the bicycle control system when detaching the electric unit from the control system, and when an error in the storage unit of the electric unit occurs.

One object of the present invention is to provide a bicycle control system that is able to prevent data in the storage unit of the electric unit from being lost.

In view of the state of the known technology and in accordance with a first aspect of the present disclosure, a bicycle control system basically comprises a plurality of electric units. Each of the plurality of electric units is configured to be mounted to a bicycle. Each of the plurality of electric units includes a storage unit. At least two of the storage units of the plurality of electric units store at least two common pieces of information.

In accordance with a second aspect of the present invention, the bicycle control system according to the first aspect is configured so that the at least two common pieces of information includes identification information for identifying the electric units.

In accordance with a third aspect of the present invention, the bicycle control system according to the first aspect is configured so that the at least two common pieces of information includes setting information, which is information for determining an operation of the plurality of electric units.

In accordance with a fourth aspect of the present invention, the bicycle control system according to the first aspect is configured so that the at least two common pieces of information includes log information, which is a history of operations of the electric units.

In accordance with a fifth aspect of the present invention, the bicycle control system according to the first aspect is configured so that the at least two common pieces of information includes setting information, which is information for determining an operation of the electric units, and at least two of the storage units of the plurality of electric units share all of the setting information.

In accordance with a sixth aspect of the present invention, the bicycle control system according to the first aspect is configured so that the at least two common pieces of information includes log information, which is the history of operations of the electric units, and at least two of the storage units of the plurality of electric units share all of the log information.

In accordance with a seventh aspect of the present invention, the bicycle control system according to any one of the first to sixth aspects is configured so that at least one of the plurality of electric units overwrites the information stored in the storage units of another of the plurality of electric units, and stores, or accumulates and stores, this information.

In accordance with an eighth aspect of the present invention, the bicycle control system according to any one of the first to seventh aspects is configured so that at least one of the plurality of electric units determines whether or not to store the information stored in the storage units of the other of the plurality of electric units, depending on contents of the information.

In accordance with a ninth aspect of the present invention, the bicycle control system according to any one of the first to eighth aspects is configured so that at least one of the plurality of electric units outputs information that is stored in the storage unit, along with updating the output target information.

In accordance with a tenth aspect of the present invention, the bicycle control system according to any one of the first to ninth aspects is configured so that at least one of the plurality of electric units outputs information that is stored in the storage unit to the other of the plurality of electric units every time a prescribed period has elapsed.

In accordance with an eleventh aspect of the present invention, the bicycle control system according to any one of the first to eighth tenth is configured so that the plurality of electric units includes at least three of the electric units.

In accordance with a twelfth aspect of the present invention, the bicycle control system according to the eleventh aspect is configured so that at least three of the storage units of the at least three of the electric units store the at least two common pieces of information.

In accordance with a thirteenth aspect of the present invention, the bicycle control system according to the eleventh or twelfth aspect is configured so that a first pair comprising any two of the at least three electric units stores the at least two common pieces of information, and a second pair comprising two of the at least three electric units that is a different combination from the first pair stores at least two common pieces of information that are different from the first pair of the at least three electric units.

In accordance with a fourteenth aspect of the present invention, the bicycle control system according to any one of the eleventh to thirteenth aspects is configured so that at least one of the at least three electric units determines whether or not to store the information received from other of the electric units than the at least three electric units, depending on the source of the information.

In accordance with a fifteenth aspect of the present invention, the bicycle control system according to any one of the eleventh to fourteenth aspects is configured so that at least one of the at least three electric units comprises a function to output information to the other electric units of the at least three electric units.

In accordance with a sixteenth aspect of the present invention, the bicycle control system according to any one of the eleventh to fifteenth aspects is configured so that at least one of the at least three electric units acquires information regarding one of the other electric units, and when the information does not conform to a prescribed condition, outputs the information to another of the electric units that is different from the one of the other electric units.

In accordance with a seventeenth aspect of the present invention, the bicycle control system according to any one of the eleventh to sixteenth aspects is configured so that at least one of the at least three electric units determines a destination for the information, depending on contents of the output target information.

In accordance with an eighteenth aspect of the present invention, the bicycle control system according to any one of the first to seventeenth aspects further comprises an operating unit for changing the settings regarding at least one of an output target of the common information and the common information.

In accordance with a nineteenth aspect of the present invention, the bicycle control system according to any one of the first to eighteenth aspects further comprises a power communication line connecting the plurality of electric units to each other.

In accordance with a twentieth aspect of the present invention, the bicycle control system according to any one of the first to nineteenth aspects is configured so that at least one of the plurality of electric units is an electric component.

In accordance with a twenty-first aspect of the present invention, the bicycle control system according to any one of the first to twentieth aspects is configured so that each of the plurality of electric units is configured to be attached to the bicycle in a traveling state.

In accordance with a twenty-second aspect of the present invention, the bicycle control system according to any one of the first to twenty-first aspects is configured so that each of the plurality of electric units comprises an output unit that outputs the common information stored in the storage unit outside of the bicycle control system.

The bicycle control system described above is able to prevent information (data) in the storage unit of the electric unit from being lost.

Also other objects, features, aspects and advantages of the disclosed bicycle control system will become apparent to those skilled in the art from the following detailed description, which, taken in conjunction with the annexed drawings, discloses illustrative embodiments of the bicycle control system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
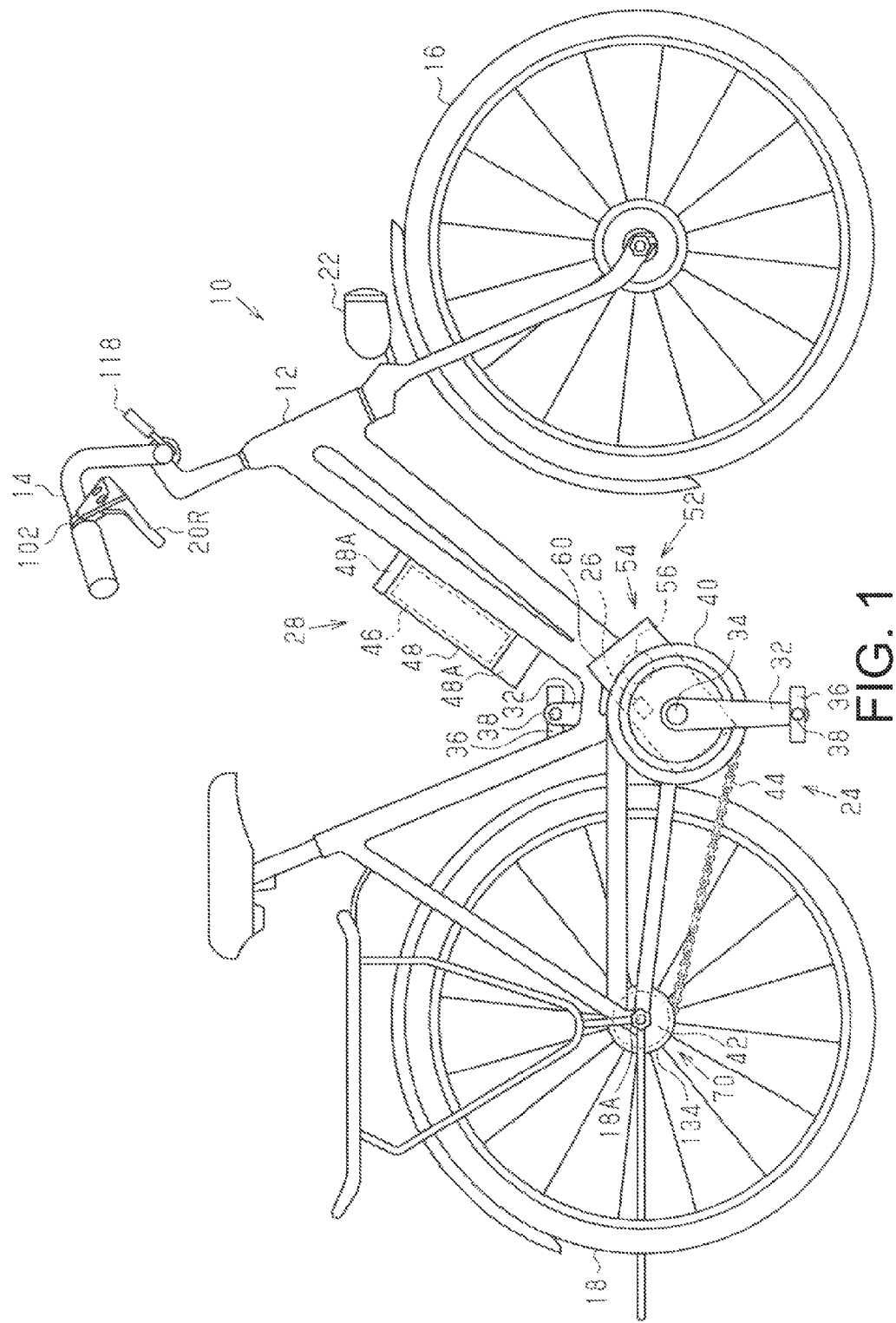
FIG. 1 is a side elevational view of a bicycle that is equipped with a bicycle control system in accordance with one illustrated embodiment.

Referring initially to FIG. 1, a bicycle 10 is illustrated that is equipped with a bicycle control system in accordance with a first embodiment. The bicycle 10 comprises a frame 12, a handlebar 14, a front wheel 16, a rear wheel 18, a pair of brake levers 20R, 20L (see FIG. 3), a lamp 22 that is attached to the frame 12, a drive mechanism 24, a torque sensor 26, a battery unit 28 and a control system 50 (see FIG. 2).

The drive mechanism 24 comprises left and right crank arms 32, a crankshaft 34, left and right pedals 36, left and right pedal shafts 38, a front sprocket 40, a rear sprocket 42, and a chain 44. Both the left and right crank arms 32 are attached to the two ends of the crankshaft 34 and are rotatably attached to the frame 12 via the crankshaft 34. The pedal 36 is attached to the crank arm 32 so as to be able to rotate around a pedal shaft 38.

The front sprocket 40 is coupled to the crankshaft 34. The front sprocket 40 is provided coaxially with the crankshaft 34.

The rear sprocket 42 is rotatably attached around an axle 18A of the rear wheel 18. The rear sprocket 42 is coupled with the rear wheel 18 via a one-way clutch. The chain 44 is wound onto the front sprocket 40 and the rear sprocket 42. When the crank arm 32 rotates due to the manual drive force that is applied to the pedal 36, the rear wheel 18 is rotated by the front sprocket 40, the chain 44, and the rear sprocket 42.

A torque sensor 26 outputs a signal corresponding to the torque that is applied to the crankshaft 34. The torque that is applied to the crankshaft 34 correlates with the manual drive force that is applied to the pedal 36. For this reason, the torque sensor 26 outputs a signal corresponding to the manual drive force. The torque sensor 26 can be provided along the power transmission path from the crankshaft 34 to the front sprocket 40, in the vicinity of the power transmission path, or to the crank arm 32 or the pedal 36. The torque sensor 26 can be realized by using, for example, a strain sensor, a magnetostrictive sensor, an optical sensor, or a pressure sensor, and any sensor that outputs a signal corresponding to the manual force that is applied to the crank arm 32 or the pedal 36 can be employed.

The battery unit 28 comprises a battery 46 and a case 48 that houses the battery 46. The case 48 is detachably attached to the frame 12 by a holder 48A. The battery 46 includes one or a plurality of battery cells. The battery 46 is a secondary battery. The battery 46 supplies power to a control system 50 (refer to FIG. 2) and a lamp 22.

Figure 2:
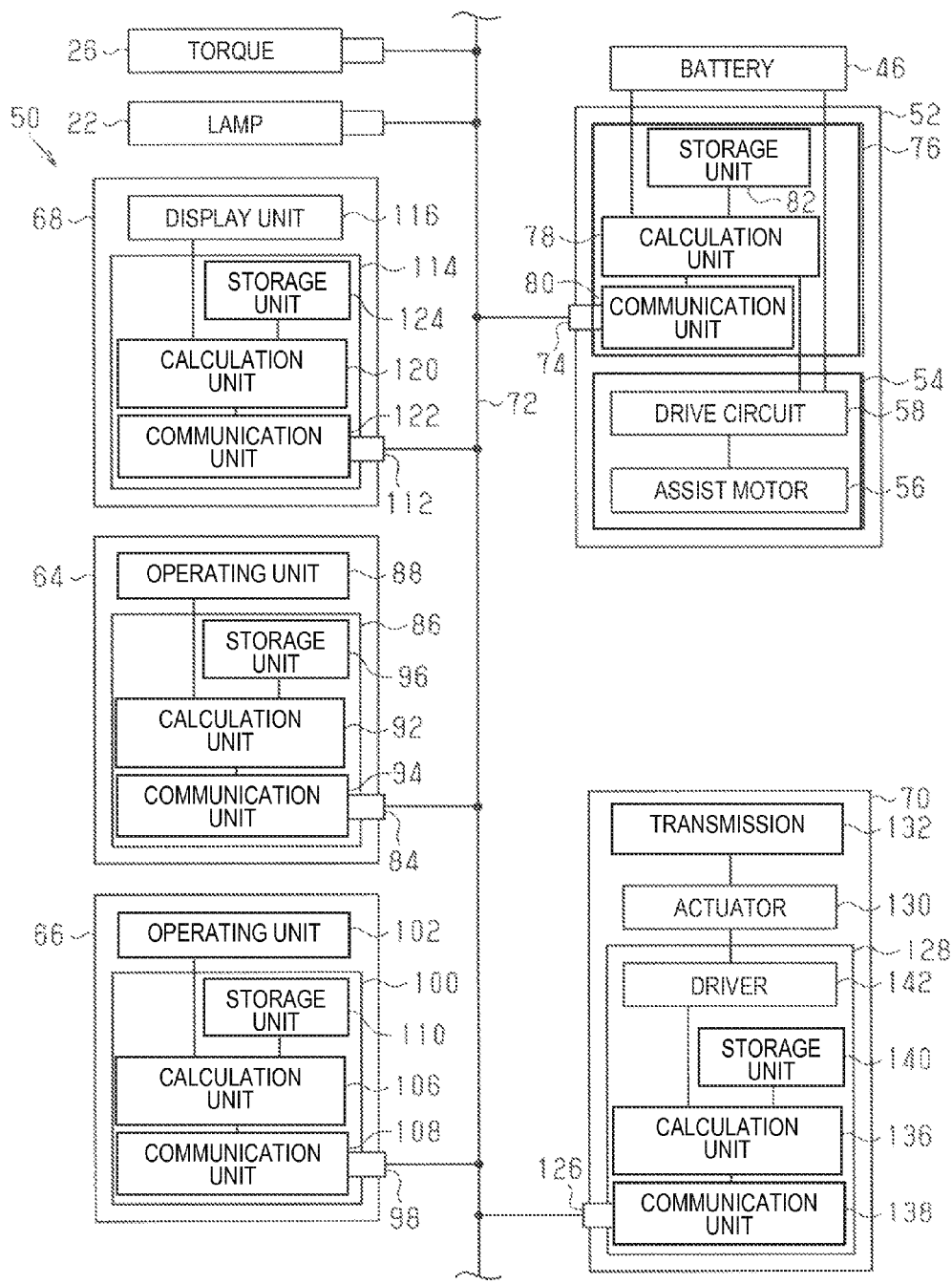
FIG. 2 is a block diagram of the bicycle control system illustrated in FIG. 1.

As shown in FIG. 2, the control system 50 comprises a drive unit 52, a first operating unit 64, a second operating unit 66, a display unit 68, and a gear shifter 70. The drive unit 52, the first operating unit 64, the second operating unit 66, the display unit 68, and the gear shifter 70 is configured to be attached to a bicycle 10 in a traveling state (refer to FIG. 1). In other words, the bicycle 10 (refer to FIG. 1) is configured to be operated in a state in which the drive unit 52, the first operating unit 64, the second operating unit 66, the display unit 68, and the gear shifter 70 are attached.

The drive unit 52, the first operating unit 64, the second operating unit 66, the display unit 68, and the gear shifter 70 are bus-connected by a power communication line 72, and they conduct power line communications (PLC: Power Line Communication). Power is supplied to the first operating unit 64, the second operating unit 66, the display unit 68, and the gear shifter 70 from the battery 46 via the power communication line 72. The drive unit 52 and the gear shifter 70 are electric components, as well as electric units. The first operating unit 64, the second operating unit 66, and the display unit 68 are electric components, as well as electric units. Information that is output from the drive unit 52, the first operating unit 64, the second operating unit 66, the display unit 68, and the gear shifter 70 is provided to all of the other electric units by power line communication.

The drive unit 52 comprises a port 74 to which can be attached and detached an assist unit 54, a housing 60, the power communication line 72, and a control device 76. The assist unit 54 and the control device 76 are housed in the housing 60. The housing 60 is attached to the frame 12. The control device 76 may also be provided outside of the housing 60.

The assist unit 54 comprises a drive circuit 58 comprising an assist motor 56 and an inverter.

As shown in FIG. 1, the assist unit 54 is disposed around the crankshaft 34. The assist motor 56 is an electric motor. The rotation of the assist motor 56 is transmitted to the front sprocket 40 via a reduction gear (not diagrammed). A one-way clutch for preventing the motor from being rotated by the manual drive force when the crank arm 32 rolls forward can be provided between the motor 56 and the front sprocket 40. The drive unit 52 may be configured to include the crankshaft 34.

As shown in FIG. 2, the control device 76 is a microcomputer that has a processor with a calculation unit 78 that conducts various calculations. The control device 76 further comprises a communication unit 80 that conducts power line communications and a storage unit 82 that stores various information (data) and programs. The storage unit 82 is a memory device. The control device 76 controls the drive circuit 58 and controls the movement of the assist motor 56.

The information that is stored by the storage unit 82 includes identification information for identifying the drive unit 52 and for setting information, which is information that determines the operation of the drive unit 52, and log information, which is a history of the operations of the drive unit 52. The identification information is stored in the storage unit 82 beforehand, at the time of shipping. The setting information is stored in the storage unit 82 beforehand, at the time of shipping. The setting information is updated by operating units 64, 66 or an external device. The log information is updated and/or added to when the drive unit 52 is operated.

Examples of the identification information include the serial number of the drive unit 52 and the version number of the software, etc. Examples of the setting information include the type of gear shifter 70 that is attached to the bicycle 10 (for example, the model number), the mounting angle of the drive unit 52 to the frame 12, the tire circumference of the bicycle 10 to which the drive unit 52 is attached, the number of teeth on the front sprocket 40, the number of teeth on the rear sprocket 42, the presence/absence of a connection to the lamp 22, and the ON/OFF, etc. of the start mode. The start mode is a setting regarding whether or not to automatically store various information when the bicycle 10 starts traveling, and an example of the various information is the travel distance.

Examples of the log information include the number of resets of the drive unit 52, the number of errors in the battery unit 28, the number of times that the charge level the battery 46 becomes "0," the number of authentication failures of the battery 46, the number of communication errors with the battery 46, and the number of communication errors with the drive circuit 58 of the assist unit 54.

The calculation unit 78 outputs all of the identification information, the setting information, and the log information stored in the storage unit 82, along with information that is unique to itself (for example the serial number), from the communication unit 80 every time a prescribed period has elapsed. Additionally, when information that is output from the first operating unit 64, the second operating unit 66, the display unit 68, and the gear shifter 70, which are the other electric units, is input by the communication unit 80, the calculation unit 78 overwrites and stores the input information in the storage unit 82.

Figure 3:
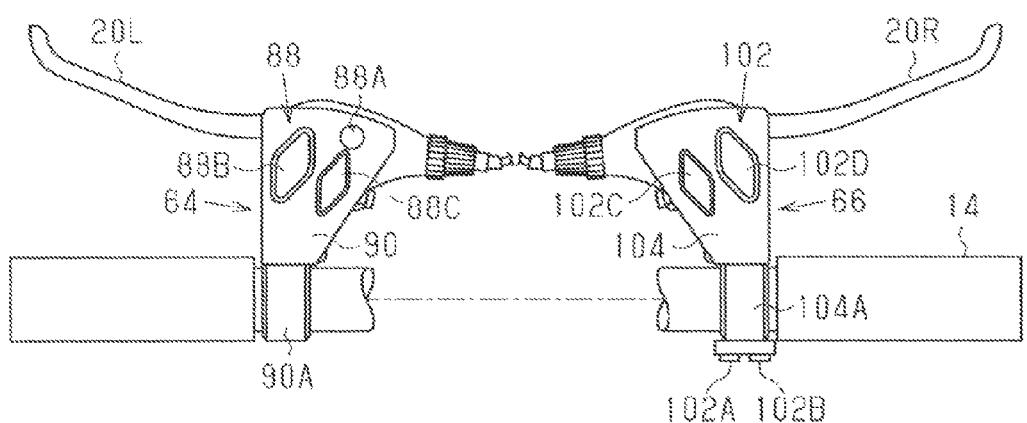
FIG. 3 is a plan view of a first gear shifter and a second gear shifter illustrated in FIG. 1.

The first operating unit 64 comprises a port 84 to which can be attached and detached a power communication line 72, a control device 86, an operating unit 88, and a case 90 that houses the control device 86 (refer to FIG. 3). As shown in FIG. 2, the control device 86 is a microcomputer that has a processor with a calculation unit 92 that conducts various calculations. The control device 86 further comprises a communication unit 94 that conducts power line communications and a storage unit 96 that stores various information (data) and programs. The storage unit 96 includes a memory device. The first operating unit 64 functions as an operating device for changing the assist force in relation to the manual drive force.

As shown in FIG. 3, the case 90 is detachably attached to the handlebar 14 by a holder 90A. The case 90 is integrally formed with the attaching portion of the left brake lever 20L. The case 90 and the brake lever 20L may be configured from separate bodies. The operating unit 88 comprises three buttons, 88A, 88B, and 88C. The first operating unit 64 outputs various signals according to the operation of each button 88A-88C.

Specifically, if the button 88A is set to be a button for starting or ending the assist from the drive unit 52 (refer to FIG. 2), the first operating unit 64 outputs a signal to start or to end the supply of power to the assist unit 54 (refer to FIG. 2) when the button 88A is pressed. If the button 88B is set to be a button for increasing the assisting force, the first operating unit 64 outputs a signal to increase the power that is supplied to the assist unit 54 (refer to FIG. 2) when the button 88B is pressed. If the button 88C is set to be a button for decreasing the assisting force, the first operating unit 64 outputs a signal to decrease the power that is supplied to the assist unit 54 (refer to FIG. 2) when the button 88C is pressed.

The information that is stored by the storage unit 96 shown in FIG. 2 includes identification information for identifying the first operating unit 64; setting information, which is information that determines the operation of the first operating unit 64; and log information, which is a history of the operations of the first operating unit 64. The identification information is stored in the storage unit 96 beforehand, at the time of shipping. The setting information is stored in the storage unit 96 beforehand, at the time of shipping. The setting information is updated by operating units 64, 66 or an external device. The log information is updated and/or added to when the first operating unit 64 is operated.

Examples of the identification information include the serial number of the first operating unit 64 and the version number of the software, etc. Examples of the setting information include the operation target of the first operating unit 64 and the allocation of the buttons 88A-88C of the operating unit 88 (refer to FIG. 3).

Examples of the log information include the number of resets of the first operating unit 64, the number of times that each button 88A-88C shown in FIG. 3 has been pressed, and the number of errors for each button 88A-88C. The number of errors for each button 88A-88C is stored in the storage unit 96 by counting the number of errors when a signal from each button 88A-88C is input into the calculation unit 92 shown in FIG. 2 over a prescribed period of time; the calculation unit 92 determines that a locking error is occurring in each button 88A-88C (refer to FIG. 3).

The calculation unit 92 outputs all of the identification information, the setting information, and the log information stored in the storage unit 96, along with information that is unique to itself, from the communication unit 94 every time a prescribed period has elapsed. Additionally, when information that is output from the drive unit 52, the second operating unit 66, the display unit 68, and the gear shifter 70, which are the other electric units, is input from the communication unit 94, the calculation unit 92 overwrites and stores the input information in the storage unit 96.

The second operating unit 66 comprises a port 98 to which can be attached and detached a power communication line 72, a control device 100, an operating unit 102, and a case 104 that houses the control device 100 (refer to FIG. 3). The control device 100 further comprises a communication unit 108 that conducts power line communications and a storage unit 110 that stores various information (data) and programs. The storage unit 110 includes a memory device. The second operating unit 66 functions as an operating device for gear shifting and performing various operations.

As shown in FIG. 3, the case 104 is detachably attached to the handlebar 14 by a holder 104A. The case 104 is integrally formed with the attaching portion of the right brake lever 20R. The case 104 and the brake lever 20R may be configured from separate bodies. The operating unit 102 comprises four buttons 102A, 102B, 102C, and 102D. The second operating unit 66 outputs various signals according to the operation of each button 102A-102D.

Specifically, if the button 102A is set to be a button for increasing the gear ratio, the second operating unit 66 outputs an upshift signal when the button 102A is pressed. If the button 102B is set to be a button for decreasing the gear ratio, the second operating unit 66 outputs a downshift signal when the button 102B is pressed. Upshifting is a shift in the direction that increases the gear ratio, and downshifting is a shift in the direction that decreases the gear ratio.

If the button 102C is set to be a button for turning the lamp 22 (refer to FIG. 1) on and off, the second operating unit 66 outputs a signal to turn the lamp 22 on or off when the button 102C is pressed. If the button 102D is set to be a button for changing the contents displayed on the display unit 116 (refer to FIG. 1) of the display unit 68, the second operating unit 66 outputs a signal to change the contents displayed in the display unit 116 when the button 102D is pressed.

The information that is stored by the storage unit 110 shown in FIG. 2 includes identification information for identifying the second operating unit 66; the setting information, which is information that determines the operation of the second operating unit 66; and the log information, which is a history of the operations of the second operating unit 66. The identification information is stored in the storage unit 110 beforehand, at the time of shipping. The setting information is stored in the storage unit 110 beforehand, at the time of shipping. The setting information is updated by operating units 64, 66 or an external device. The log information is updated and/or added to when the second operating unit 66 is operated.

Examples of the identification information include the serial number of the second operating unit 66 and the version number of the software, etc.

Examples of the setting information include the operation target of the second operating unit 66 and the allocation of the buttons 102A-102D of the operating unit 102 (refer to FIG. 3).

Examples of the log information include the number of resets of the second operating unit 66, the number of times that each button 102A-102D shown in FIG. 3 has been pressed, and the number of errors for each button 102A-102D. The number of errors for each button 102A-102D is stored in the storage unit 110 by counting the number of errors when a signal from each button 102A-102D is input into the calculation unit 106 shown in FIG. 2 over a prescribed period of time; the calculation unit 106 determines that a locking error is occurring in each button 102A-102D (refer to FIG. 3).

The calculation unit 106 outputs all of the identification information, the setting information, and the log information stored in the storage unit 110, along with information that is unique to itself, from the communication unit 108 every time a prescribed period has elapsed. Additionally, when information that is output from the drive unit 52, the first operating unit 64, the display unit 68, and the gear shifter 70, which are the other electric units, is input from the communication unit 108, the calculation unit 106 overwrites and stores the input information in the storage unit 110.

Figure 4:
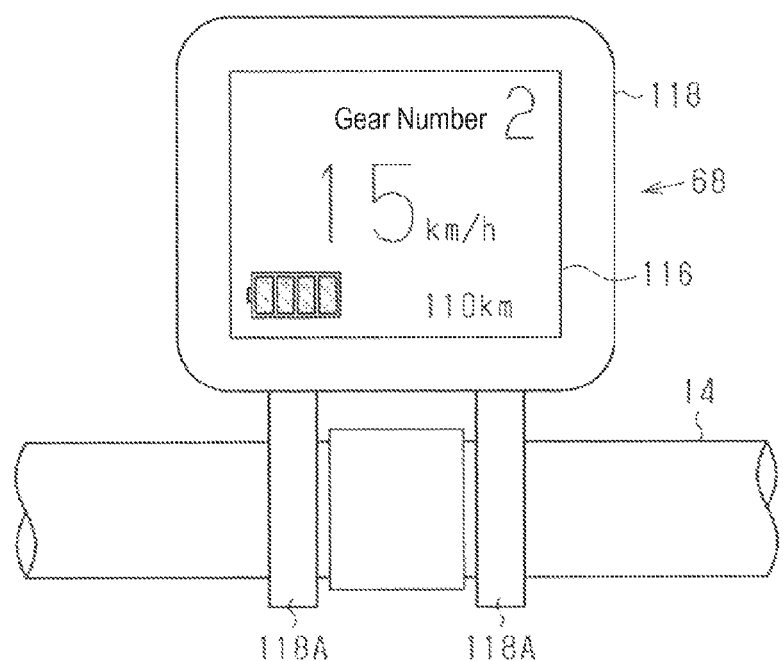
FIG. 4 is a front view of a display unit illustrated in FIG. 1.

The display unit 68 comprises a port 112 to which can be attached and detached a power communication line 72, a control device 114, a display unit 116, and a case 118 that houses the control device 114 (refer to FIG. 4). As shown in FIG. 2, the control device 114 is a microcomputer that has a processor with a calculation unit 120 that conducts various calculations. The control device 114 further comprises a communication unit 122 that conducts power line communications and a storage unit 124 that stores various information (data) and programs. The storage unit 124 includes a memory device.

As shown in FIG. 4, the case 118 is detachably attached to the handlebar 14 by a holder 118A. The display unit 116 displays various types of data. The display unit 116 is, for example, a liquid crystal monitor. Examples of various information include the travel speed, the travel distance, the gear ratio or the shift position of the transmission 132 (refer to FIG. 2), the assisting force from the assist motor 56 (refer to FIG. 1), and the charge level of the battery 46 (refer to FIG. 1).

The information that is stored by the storage unit 124 shown in FIG. 2 includes identification information for identifying the display unit 68; the setting information, which is information that determines the operation of the display unit 68; and the log information, which is a history of the operations of the display unit 68. The identification information is stored in the storage unit 124 beforehand, at the time of shipping. The setting information is stored in the storage unit 124 beforehand, at the time of shipping. The setting information is updated by operating units 64, 66 or an external device. The log information is updated and/or added to when the display unit 68 is operated.

Examples of the identification information include the serial number of the display unit 68 and the version number of the software, etc.

Examples of the setting information include the ON/OFF of the backlight of the display unit 116, the items to be displayed on the display unit 116, the unit of information that is displayed on the display unit 116, the language of the information that is displayed on the display unit 116, and the ON/OFF of the beep sound.

Examples of the log information include the number of resets of the display unit 68, the information display time on the display unit 116, and the lighting time of the backlight of the display unit 116.

The calculation unit 120 outputs all of the identification information, the setting information, and the log information stored in the storage unit 124, along with information that is unique to itself, from the communication unit 122 every time a prescribed period has elapsed. Additionally, when information that is output from the drive unit 52, the first operating unit 64, the second operating unit 66, and the gear shifter 70, which are the other electric units, is input from the communication unit 122, the calculation unit 120 overwrites and stores the input information in the storage unit 124.

The gear shifter 70 comprises a port 126 to which can be attached and detached a power communication line 72, a control device 128, an actuator 130, a transmission 132, and a housing 134 that houses the above (refer to FIG. 1). As shown in FIG. 2, the control device 128 is a microcomputer that has a processor with a calculation unit 136 that conducts various calculations. The control device 128 further comprises a communication unit 138 that conducts power line communications and a storage unit 140 that stores various information (data) and programs. The storage unit 140 includes a memory device. The control device 128 further comprises a driver 142 for driving the actuator 130.

The actuator 130 is, for example, an electric motor. The transmission 132 is an internal transmission that is integrated with a hub of the rear wheel 18 (refer to FIG. 1). The transmission 132 is formed by a planetary gear mechanism and is able to change the gear ratio in a stepwise manner. The actuator 130 changes the gear ratio by changing the coupling state of the gears that configure the planetary gear mechanism.

The information that is stored by the storage unit 140 includes the identification information for identifying the gear shifter 70; the setting information, which is information that determines the operation of the gear shifter 70; and the log information, which is a history of the operations of the gear shifter 70. The identification information is stored in the storage unit 140 beforehand, at the time of shipping. The setting information is stored in the storage unit 140 beforehand, at the time of shipping. The setting information is updated by operating units 64, 66 or an external device. The log information is updated and/or added to when the gear shifter 70 is operated.

Examples of the identification information include the serial number of the gear shifter 70 and the version number of the software, etc.

Examples of the log information include the number of times the gear ratio is changed, the number of failed attempts to change the gear ratio, the presence/absence of multi-stage shifting limits, the adjustment values of the transmission 132, and the current gear ratio. The adjustment value of the transmission 132 is, for example, the current amount that is supplied to the actuator 130, which is updated to a value corrected by the calculation unit 136 upon a failed attempt to change the gear ratio.

The calculation unit 136 outputs all of the identification information, the setting information, and the log information stored in the storage unit 140, along with information that is unique to itself, from the communication unit 138 every time a prescribed period has elapsed. Additionally, when information that is output from the drive unit 52, the first operating unit 64, the second operating unit 66, and the gear shifter 70, which are the other electric units, is input from the communication unit 138, the calculation unit 136 overwrites and stores the input information in the storage unit 124.

The operation of the control system 50 will be explained. The control device 76 of the drive unit 52 outputs a control signal for controlling a drive circuit 58 of the assist unit 54 based on a signal from the torque sensor 26 and a signal from the first operating unit 64. The drive circuit 58 supplies power from the battery 46 to the assist motor 56, based on the control signal from the control device 76, to drive the assist motor 56. The assist motor 56 thereby executes an assist corresponding to the manual drive force and an operation of the first operating unit 64.

The control device 76 of the drive unit 52 outputs a control signal for controlling a control device 128 of the gear shifter 70 based on a signal from the second operating unit 66. The control device 128 supplies power from the battery 46 to the actuator 130 via a driver 142 based on the control signal from the control device 76 to drive the actuator 130. Specifically, the control device 76 outputs a control signal to upshift the gear ratio of the transmission 132 when an upshift signal is input by the second operating unit 66. The control device 76 outputs a control signal to downshift the gear ratio of the transmission 132 when a downshift signal is input by the second operating unit 66. When an upshift signal is input at the time of maximum gear ratio, and when a downshift signal is input at the time of minimum gear ratio, the control device 76 will not drive the actuator 130.

The control device 76 of the drive unit 52 supplies power to the lamp 22 based on a signal from the second operating unit 66. Specifically, the control device 76 switches between supplying and stopping power to the lamp 22 upon an input of a signal that is output when the buttons 102A-102D (refer to FIG. 3), which are set to turn the lamp 22 on and off, are pressed.

The control device 76 of the drive unit 52 outputs a control signal for switching the display contents of the display unit 68 based on a signal from the second operating unit 66. Specifically, the control device 76 outputs a control signal for switching the display contents of the display unit 68 upon an input of a signal that is output when the buttons 102A-102D (refer to FIG. 3), which are set to switch the display contents of the display unit 116, are pressed.

The action and effects of the control system 50 will be described.

(1) Units 52, 64, 66, 68, and 70, which configure the control system 50, store information that is stored in the storage units 82, 96, 110, 124, and 140 of the other units 52, 64, 66, 68, and 70 and that are output from the other units 52, 64, 66, 68, and 70 within the storage units 82, 96, 110, 124, and 140. That is, the storage units 82, 96, 110, 124, and 140 of each unit 52, 64, 66, 68, and 70, as well as the storage units 82, 96, 110, 124, and 140 of the other units 52, 64, 66, 68, and 70, store two or more common pieces of information. That is, the information that is stored in the storage units 82, 96, 110, 124, and 140 of one unit 52, 64, 66, 68, or 70 is backed up by the storage units 82, 96, 110, 124, and 140 of the other units 52, 64, 66, 68, and 70.

Each unit 52, 64, 66, 68, and 70 is capable of reading information that is stored in the other units 52, 64, 66, 68, and 70. For this reason, even if information stored in the storage units 82, 96, 110, 124, and 140 of one unit 52, 64, 66, 68, and 70 is lost, the same information as the lost information is stored in the storage units 82, 96, 110, 124, and 140 of the other units 52, 64, 66, 68, and 70; as a result, preventing the information from being completely lost is possible. Since information can be read from the other units 52, 64, 66, 68, and 70 when replacing a unit 52, 64, 66, 68, or 70, when removing these from the control system 50, or upon the occurrence of an error, retrieving the necessary information will be easier and more convenient for a person working on the bicycle. For example, when replacing one of the units 52, 64, 66, 68, and 70, the setting information can be set by the following operations. After connecting the replacement unit to the power communication line 72, the calculation unit of the replacement unit requests an output of the information that is stored in the other units by operating the operating units 88, 102 or with an external device that is connected to the control system 50. The replacement unit receives information to be stored from the other units and stores this in the storage unit. The configuration may be such that, if the replacement unit is connected to the power communication line 72 in a state in which the setting information is not stored in the unit, the calculation unit of the replacement unit will automatically request an output of information that is stored in the other units when power line communication becomes possible. The replacement unit receives information to be stored from the other units and stores this in the storage unit.

(2) The common information that is stored in each unit 52, 64, 66, 68, and 70 includes information for identifying each unit 52, 64, 66, 68, and 70. For this reason, if, for example, one of the units 52, 64, 66, 68, and 70 fails, obtaining the model number, etc., of the failed unit 52, 64, 66, 68, or 70 is possible using the information that is stored in the other units 52, 64, 66, 68, and 70.

(3) The common information that is stored in each unit 52, 64, 66, 68, and 70 includes the setting information of each unit 52, 64, 66, 68, and 70. For this reason, for example, when replacing one of the units 52, 64, 66, 68, and 70, setting the previous setting information to the replacement unit 52, 64, 66, 68, and 70 is possible using the information that is stored in the other units 52, 64, 66, 68, and 70.

(4) The common information that is stored in each unit 52, 64, 66, 68, and 70 includes the log information of each unit 52, 64, 66, 68, and 70. For this reason, for example, when one of the units 52, 64, 66, 68, and 70 fails, the replacement unit 52, 64, 66, 68, and 70 can inherit the log information of the failed unit 52, 64, 66, 68, and 70 by using the information that is stored in the other units 52, 64, 66, 68, and 70.

(5) Each unit 52, 64, 66, 68, and 70 shares all of the information that is stored in each storage unit 82, 96, 110, 124, and 140. For this reason, preventing information that is stored by the storage units 82, 96, 110, 124, and 140 of one unit 52, 64, 66, 68, and 70 from disappearing is possible.

The specific form that the present control system 50 can take is not limited to the forms illustrated in the above-described embodiment. The present control system 50 can take various forms that are different from the above-described embodiment. The modified example of the above-described embodiment explained below is one example of the various forms that the present control system 50 can take.

Figure 5:
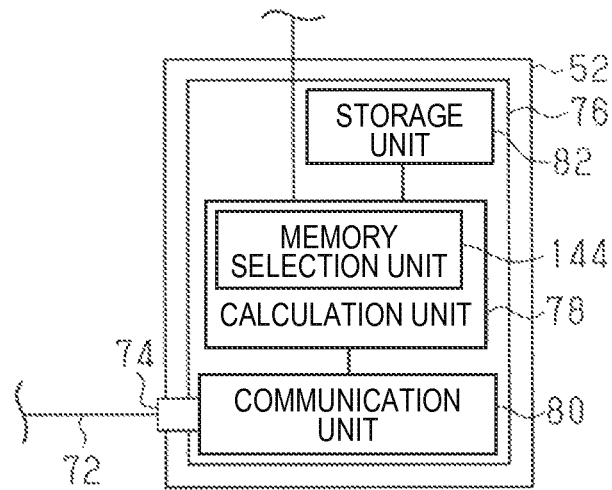
FIG. 5 is a block diagram of a first modified example of an electric unit.

At least one of the units 52, 64, 66, 68, and 70 may comprise a memory selection unit 144. For example, the memory selection unit 144 shown in FIG. 5 is provided to the drive unit 52. The memory selection unit 144 determines whether or not to store the information from the other units 64, 66, 68, and 70 that is input to the drive unit 52, according to the contents of the information. The conditions for determining whether the memory selection unit 144 stores or not may be set in advance or may be set in each unit 52, 64, 66, 68, and 70 by using the display unit 68, the first operating unit 64, or the second operating unit 66 or by connecting an external device to the communication unit.

In the modified example shown in FIG. 5, the memory selection unit 144 may determine whether or not to store the information from the other units 64, 66, 68, and 70 that is input to the drive unit 52, according to the source of the information.

Two storage units 82, 96, 110, 124, and 140 of the storage units 82, 96, 110, 124, and 140 of the units 52, 64, 66, 68, and 70 may be configured as a first pair. One of the units 52, 64, 66, 68, and 70 that configures the first pair stores information that is output from the other unit 52, 64, 66, 68, and 70 that configures the first pair. The units 52, 64, 66, 68, and 70 that do not configure the first pair do not store the information that is output from the units 52, 64, 66, 68, and 70 that configure the first pair.

Additionally, two storage units 82, 96, 110, 124, and 140 of the storage units 82, 96, 110, 124, and 140 of the units 52, 64, 66, 68, and 70 that are a different combination from the first pair may be configured as a second pair. One of the units 52, 64, 66, 68, and 70 that configures the second pair stores the information that is output from the other unit 52, 64, 66, 68, and 70 that configures the second pair. The units 52, 64, 66, 68, and 70 that do not configure the second pair do not store the information that is output from the units 52, 64, 66, 68, and 70 that configure the second pair. Three or more pairs may also be configured. Which units 52, 64, 66, 68, and 70 are made to be pairs can be set in advance or can be set in each unit 52, 64, 66, 68, and 70 by using the display unit 68, the first operating unit 64, or the second operating unit 66 or by connecting an external device to the communication unit.

Figure 6:
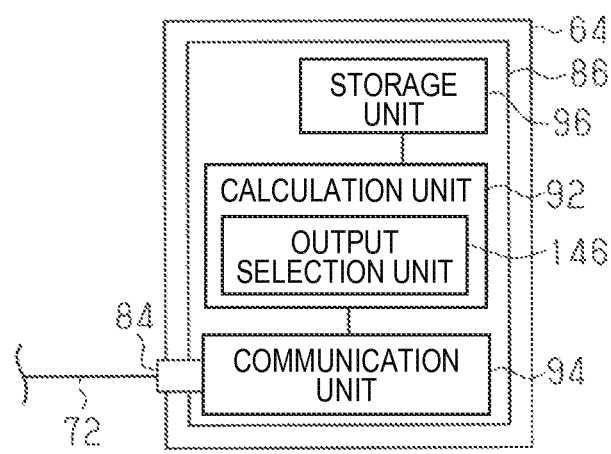
FIG. 6 is a block diagram of a second modified example of an electric unit.

At least one of the units 52, 64, 66, 68, and 70 may comprise an output selection unit 146. For example, the output selection unit 146 shown in FIG. 6 is provided to the first operating unit 64. The output selection unit 146 acquires information regarding one of the other units 52, 66, 68, and 70; when the information does not conform to a prescribed condition, the information is output to another unit 52, 66, 68, and 70, which is different from the one of the other units 52, 66, 68, and 70. In this case, the output selection unit 146 may output the information to be output, along with unique information from the units 52, 66, 68, and 70, which are the output targets. Then, only the units 52, 66, 68, and 70, which are the output targets, store the input information in the storage units 82, 96, 110, 124, and 140. The control system 50 may also add a function to change the output target of the information with the operating units 64, 66.

In the modified example shown in FIG. 6, the output selection unit 146 may select the units 52, 66, 68, and 70 as the destination for the information, according to the contents of the information to be output. Additionally, the control system 50 may add a function to change the units 52, 66, 68, and 70 as the destination for the information to be output by the operating unit 64, 66.

At least one of the units 52, 64, 66, 68, and 70 may accumulate the input information in the storage units 82, 96, 110, 124, and 140. Additionally, the units 52, 64, 66, 68, and 70 may select whether to overwrite or accumulate information, depending on the contents of the input information. For example, unique information and setting information may be overwritten and stored while log information is accumulated and stored. The accumulated information can be erased through a connection with an external device of the control system 50, such as a personal computer.

Each unit 52, 64, 66, 68, and 70 may output updated information as the output target information stored in the storage units 82, 96, 110, 124, and 140 is updated.

The storage units 82, 96, 110, 124, and 140 of each unit 52, 64, 66, 68, and 70 store all of the information stored in the other units 52, 64, 66, 68, and 70, but they may store only a part of this information. For example, only part of the information that includes the unique information, the setting information, and the log information of each unit 52, 64, 66, 68, and 70 is stored in the other units 52, 64, 66, 68, and 70.

Additionally, the storage units 82, 96, 110, 124, and 140 of only a part of the units 52, 64, 66, 68, and 70 of the storage units 82, 96, 110, 124, and 140 of each unit 52, 64, 66, 68, and 70 may store the common information. A part of the units 52, 64, 66, 68, and 70 is at least two or more units. For example, the storage unit 82 of the drive unit 52 stores the information in the storage units 96, 110, 124, and 140 of one unit 64, 66, 68, and 70 of the storage units 96, 110, 124, and 140 of the other units 64, 66, 68 and 70; and the storage units 96, 110, 124, and 140 of one unit 64, 66, 68, and 70 of the units 64, 66, 68, and 70 store the information in the storage unit 82 of the drive unit 52.

Additionally, at least one combination of the units 52, 64, 66, 68, and 70 may be able to communicate with the units 52, 64, 66, 68, and 70 by wireless communication.

There is also the possibility that at least one combination of the units 52, 64, 66, 68, and 70 is connected by an electric wiring in which the communication line that conducts only communications among the units 52, 64, 66, 68, and 70 and the power line that transmits power are separate bodies.

There is also the possibility of making the communication units 80, 94, 108, 122, and 138 of each unit 52, 64, 66, 68, and 70 function as an output unit that outputs the common information stored in the storage units 82, 96, 110, 124, and 140 to an external device. Examples of an external device are a USB or a personal computer. Additionally, an output unit for outputting the common information to an external device that is separate from the communication units 80, 94, 108, 122, and 138 may be provided to each unit 52, 64, 66, 68, and 70.

There is also the possibility of omitting one to three of the units 52, 64, 66, 68, and 70 that configure the control system 50. Yet another electric unit may also be added. Examples of another electric unit include a second gear shifter (for example, an electric front derailleur) or an on-board camera, etc. The battery unit 28 may comprise a storage unit 82 and may be an electric unit. In short, the invention may be employed with any control system as long as the control system comprises a plurality of electric units.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle control system comprising:
a plurality of electric units,
each of the plurality of electric units being configured to be mounted to a bicycle and including a storage unit,
at least two of the storage units of the plurality of electric units store at least two common pieces of identical information including setting information, which is information for determining an operation of the electric units, at least two of the storage units of the plurality of electric units at least partially sharing the setting information.

2. The bicycle control system as recited in claim 1, wherein
the at least two common pieces of information includes identification information for identifying the electric units.

3. The bicycle control system as recited in claim 1, wherein
the at least two common pieces of information includes log information, which is a history of operations of the electric units.

4. A bicycle control system comprising:
a plurality of electric units,
each of the plurality of electric units being configured to be mounted to a bicycle and including a storage unit,
at least two of the storage units of the plurality of electric units store at least two common pieces of identical information,
the at least two common pieces of information including log information, which is the history of operations of the electric units, and at least two of the storage units of the plurality of electric units at least partially sharing the log information.

5. The bicycle control system as recited in claim 1, wherein
at least one of the plurality of electric units overwrites the information stored in the storage units of another of the plurality of electric units, and stores, or accumulates and stores, this information.

6. The bicycle control system as recited in claim 1, wherein
at least one of the plurality of electric units determines whether or not to store the information stored in the storage units of the other of the plurality of electric units, depending on contents of the information.

7. The bicycle control system as recited in claim 1, wherein
at least one of the plurality of electric units outputs information that is stored in the storage unit, along with updating the output target information.

8. The bicycle control system as recited in claim 1, wherein
at least one of the plurality of electric units outputs information that is stored in the storage unit to the other of the plurality of electric units every time a prescribed period has elapsed.

9. The bicycle control system as recited in claim 1, wherein
the plurality of electric units includes at least three of the electric units.

10. The bicycle control system as recited in claim 9, wherein
at least three of the storage units of the at least three of the electric units store the at least two common pieces of information.

11. The bicycle control system as recited in claim 9, wherein
a first pair comprising any two of the at least three electric units stores the at least two common pieces of information, and a second comprising two of the at least three electric units that is a different combination from the first pair stores at least two common pieces of information that are different from the first pair of the at least three electric units.

12. The bicycle control system as recited in claim 9, wherein
at least one of the at least three electric units determines whether or not to store the information received from other of the electric units than the at least three electric units, depending on the source of the information.

13. The bicycle control system as recited in claim 9, wherein
at least one of the at least three electric units comprises a function to output information to the other electric units of the at least three electric units.

14. The bicycle control system as recited in claim 9, wherein
at least one of the at least three electric units acquires information regarding one of the other electric units, and when the information does not conform to a prescribed condition, outputs the information to another of the electric units that is different from the one of the other electric units.

15. The bicycle control system as recited in claim 9, wherein
at least one of the at least three electric units determines a destination for the information, depending on contents of the output target information.

16. A bicycle control system comprising:
a plurality of electric units, each of the plurality of electric units being configured to be mounted to a bicycle and including a storage unit, at least two of the storage units of the plurality of electric units store at least two common pieces of information; and
an operating unit for changing the settings regarding at least one of an output target of the common information and the common information.

17. The bicycle control system as recited in claim 1, further comprising
a power communication line connecting the plurality of electric units to each other.

18. The bicycle control system as recited in claim 1, wherein
at least one of the plurality of electric units is an electric component.

19. The bicycle control system as recited in claim 1, wherein
each of the plurality of electric units is configured to be attached to the bicycle in a traveling state.

20. The bicycle control system as recited in claim 1, wherein
each of the plurality of electric units comprises an output unit that outputs the common information stored in the storage unit outside of the bicycle control system.

* * * * *